US011935035B2

(12) United States Patent
Rule et al.

(10) Patent No.: US 11,935,035 B2
(45) Date of Patent: Mar. 19, 2024

(54) TECHNIQUES TO UTILIZE RESOURCE LOCATORS BY A CONTACTLESS CARD TO PERFORM A SEQUENCE OF OPERATIONS

(71) Applicant: Capital One Services, LLC, McLean, VA (US)

(72) Inventors: Jeffrey Rule, Chevy Chase, MD (US); Kaitlin Newman, Washington, DC (US); Colin Hart, Arlington, VA (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/235,112

(22) Filed: Apr. 20, 2021

(65) Prior Publication Data
US 2022/0335412 A1   Oct. 20, 2022

(51) Int. Cl.
G06Q 30/01    (2023.01)
G06Q 20/32    (2012.01)
G06Q 20/34    (2012.01)
G06Q 40/02    (2023.01)
H04L 9/32     (2006.01)

(52) U.S. Cl.
CPC ....... G06Q 20/354 (2013.01); G06Q 20/3221 (2013.01); G06Q 20/3223 (2013.01); G06Q 30/01 (2013.01); G06Q 40/02 (2013.01); H04L 9/32 (2013.01); G06Q 20/326 (2020.05); G06Q 20/341 (2013.01); G06Q 20/352 (2013.01)

(58) Field of Classification Search
CPC ............ G06Q 20/354; G06Q 20/3221; G06Q 20/3223; G06Q 30/01; G06Q 40/02; G06Q 20/326; G06Q 20/341; G06Q 20/352; H04L 9/32

USPC .......................................... 705/35
See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,592,553 | A | 1/1997 | Guski et al. |
| 5,616,901 | A | 4/1997 | Crandall |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

Primary Examiner — Bennett M Sigmond
Assistant Examiner — Michael J Warden
(74) Attorney, Agent, or Firm — KDW FIRM PLLC

(57) ABSTRACT

Embodiments may be generally directed to methods, techniques and devices to utilize a contactless card to perform a series of operations.

20 Claims, 14 Drawing Sheets

(56) References Cited

U.S. PATENT DOCUMENTS

| | | |
|---|---|---|
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,108,789 A * | 8/2000 | Dancs ............... G06Q 20/3552 |
| | | 713/168 |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,616,535 B1 * | 9/2003 | Nishizaki ............ G07F 17/3234 |
| | | 463/43 |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | Von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |

(56) References Cited

U.S. PATENT DOCUMENTS

| | | |
|---|---|---|
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |

(56) References Cited

U.S. PATENT DOCUMENTS

| | | |
|---|---|---|
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Androck et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0172026 A1* | 7/2012 | Kwon .................. H04W 12/04 455/419 |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0012751 A1* | 1/2014 | Kuhn .................. G06Q 20/367 705/41 |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0143089 A1* | 5/2014 | Campos .................. G06Q 20/28 705/26.8 |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |

(56) References Cited

U.S. PATENT DOCUMENTS

| | | |
|---|---|---|
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0364938 A1* | 12/2016 | Miranda ............ G06Q 20/3263 |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0025349 A1* | 1/2018 | Marsh ................. G06Q 20/352 705/41 |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0096340 A1* | 4/2018 | Omojola ............ G06Q 20/3221 |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0246694 A1* | 8/2020 | Umeki .................... A63F 13/34 |
| 2021/0042733 A1* | 2/2021 | Suresh ................ G06Q 20/352 |
| 2021/0319427 A1* | 10/2021 | Rule .................... G06Q 20/352 |
| 2022/0138726 A1* | 5/2022 | Rule .................... G06Q 20/352 705/71 |
| 2022/0263653 A1* | 8/2022 | Jibrin ................... H04L 9/3231 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

(56) References Cited

OTHER PUBLICATIONS

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared - or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture 10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?d=576a7b910d2d6&location=browse, 135 pages.
Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

\* cited by examiner 914-1

| Message Format | | | | |
|---|---|---|---|---|
| 1 | 2 | 4 | 8 | 8 |
| 0x43 (Message Type 'A') | Version | pATC | RND | Cryptogram A (MAC) |

| Cryptogram A (MAC) | 8 bytes | | | |
|---|---|---|---|---|
| MAC of | | | | |
| 2 | 8 | 4 | 4 | 18 bytes input data |
| Version | pUID | pATC | Shared Secret | |

918-1

| Message Format | | | |
|---|---|---|---|
| 1 | 2 | 4 | 16 |
| 0x43 (Message Type 'A') | Version | pATC | Cryptogram B |

| Cryptogram A (MAC) | 8 bytes | | |
|---|---|---|---|
| MAC of | | | |
| 2 | 8 | 4 | 4 | 18 bytes input data |
| Version | pUID | pATC | Shared Secret | |
| Cryptogram B | 16 | | |
| Sym Encryption of | | | |
| 8 | 8 | | |
| RND | Cryptogram A | | |

| Message Format | | | | |
|---|---|---|---|---|
| 2 | 8 | 4 | 8 | 8 |
| Version | pUID | pATC | RND | Cryptogram A (MAC) |

| 8 bytes | | | | |
|---|---|---|---|---|
| 8 | 8 | 4 | 4 | 18 bytes input data |
| pUID | pUID | pATC | Shared Secret | |

← 918-2

| Message Format | | | |
|---|---|---|---|
| 2 | 8 | 4 | 16 |
| Version | pUID | pATC | Cryptogram B |

| 8 bytes | | | |
|---|---|---|---|

| 8 | | 4 | 4 | 18 bytes input data |
|---|---|---|---|---|
| pUID | pUID | pATC | Shared Secret | |

| Cryptogram B | 16 | | |
|---|---|---|---|
| Sym Encryption of | | | |
| 8 | 8 | | |
| RND | Cryptogram A | | |

TECHNIQUES TO UTILIZE RESOURCE LOCATORS BY A CONTACTLESS CARD TO PERFORM A SEQUENCE OF OPERATIONS

BACKGROUND

Millions of individuals enjoy the convenience of utilizing credit cards, charge cards, debit cards, or "smart" cards as a convenient way in which to purchase goods and/or services. By utilizing these types of cards, an individual may enter into a transaction without having to have cash or currency in hand or otherwise. In the case of credit cards, charge cards and debit cards, the individual, in effect obtains an instant loan of the funds needed to make a purchase and/or enter into a transaction.

To utilize these cards customers typically must go through an activation process to activate the card. Activating a card generally involves a time-consuming process of cardholders calling a telephone number or visiting a website and entering or otherwise providing card information. However, current solutions are problematic and are subject to human error. because they require the customer to enter information and are subject to errors. Accordingly, there is an improved method of activating a card

BRIEF SUMMARY

Embodiments may be generally directed to systems, devices, and techniques including a computer-implemented method to perform an activation for a contactless card via a mobile device. The technique may include receiving a first uniform resource locator (URL) for an application from the contactless card via a wireless interface, the application configured to perform the activation, and launching the application responsive to receiving the first URL. The technique may include writing a second URL for conditions to the contactless card via the wireless interface, receiving the second URL to the conditions from the contactless card via the wireless interface, and presenting the conditions on a display of the mobile device. The technique may also include writing a third URL for a first unique identifier to identify a customer associated with the contactless card, receiving the third URL to affirm the conditions; and determining the contactless card is activated responsive, at least in part, to the conditions being affirmed.

Embodiments may be also be generally directed to techniques, and systems including an apparatus to exchange universal resource locators with a contactless card, including a processor, and memory comprising instructions that may be executed by the processor. The processor, when executing the instructions may receive a first uniform resource locator (URL) for an application from the contactless card via a wireless interface, the application configured to perform an operation for the contactless card, launch the application responsive to reception of the first URL, and write a second URL for conditions to the contactless card via the wireless interface. The processor may also receive the second URL to the conditions from the contactless card via the wireless interface, present the conditions on a display, write a third URL for a first unique identifier to identify a customer associated with the contactless card, and receive the third URL from the contactless card to affirm the conditions.

Embodiments may also include a non-transitory computer-readable medium comprising a set of instructions that, in response to being executed by a processor circuit of a contactless card, cause the processor circuit to send, responsive to a first wireless read, a first uniform resource locator (URL) for an application to a mobile device via a wireless interface, the first URL stored in a memory of a contactless card, and store, in the memory, a second URL for conditions related to the contactless card, the second URL received from the mobile device. Embodiments also include the processor circuit configured to send, responsive to a second wireless read, the second URL to the conditions to the mobile device, store, in the memory, a third URL for a unique identifier to identify a customer associated with the contactless card, and send, responsive to a third wireless read, the third URL to affirm the conditions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

BRIEF DESCRIPTION OF THE SEVERAL VIEWS OF THE DRAWINGS

Figure 1:
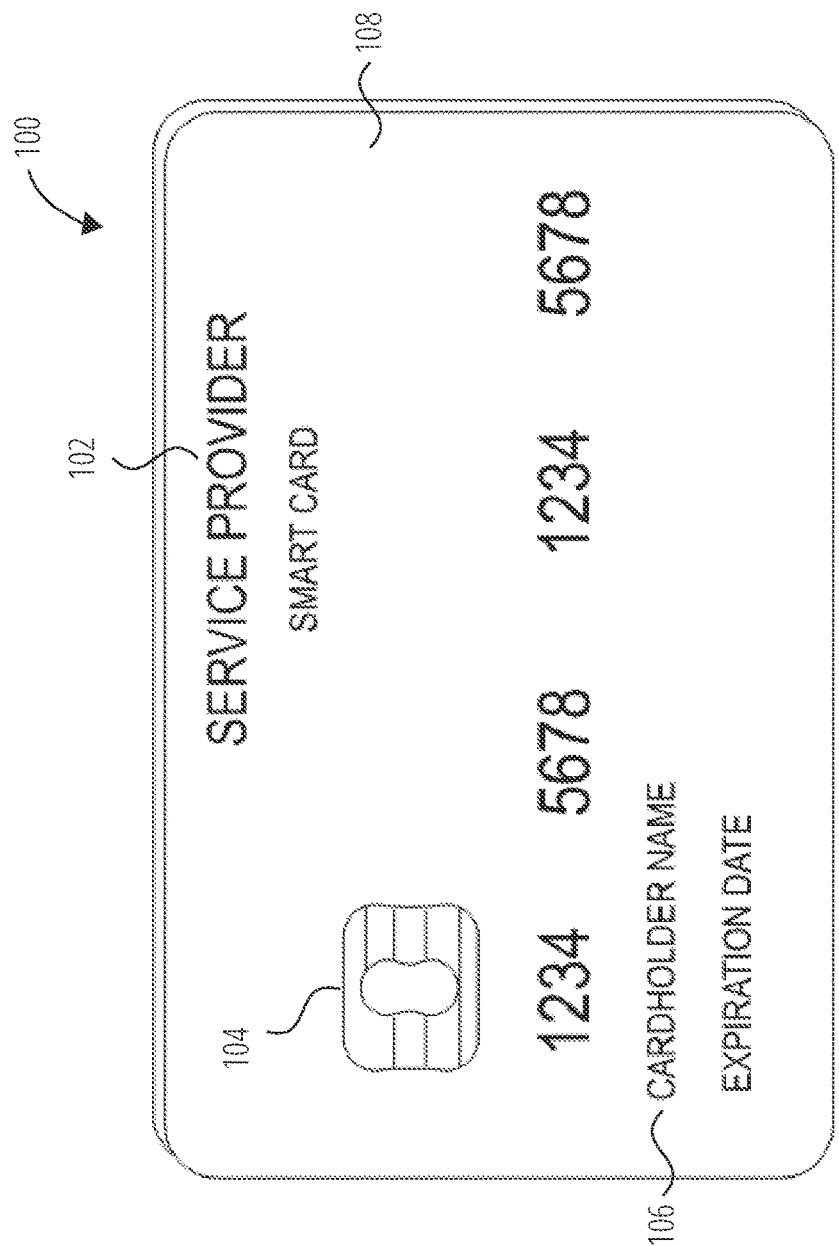

FIG. 1 illustrates a contactless card 100 in accordance with embodiments.

Figure 2:
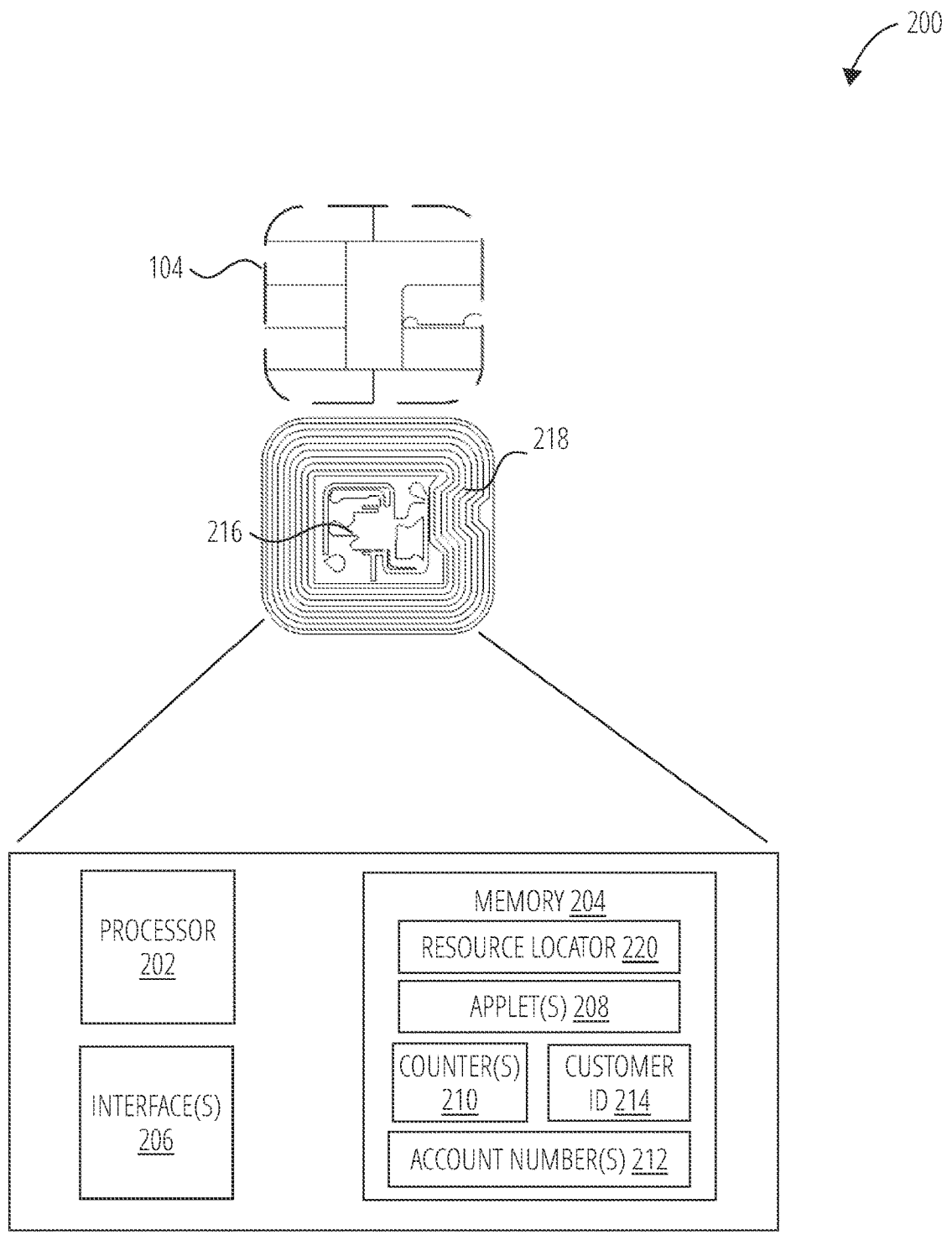

FIG. 2 illustrates a contactless card component 200 in accordance with embodiments.

Figure 3:
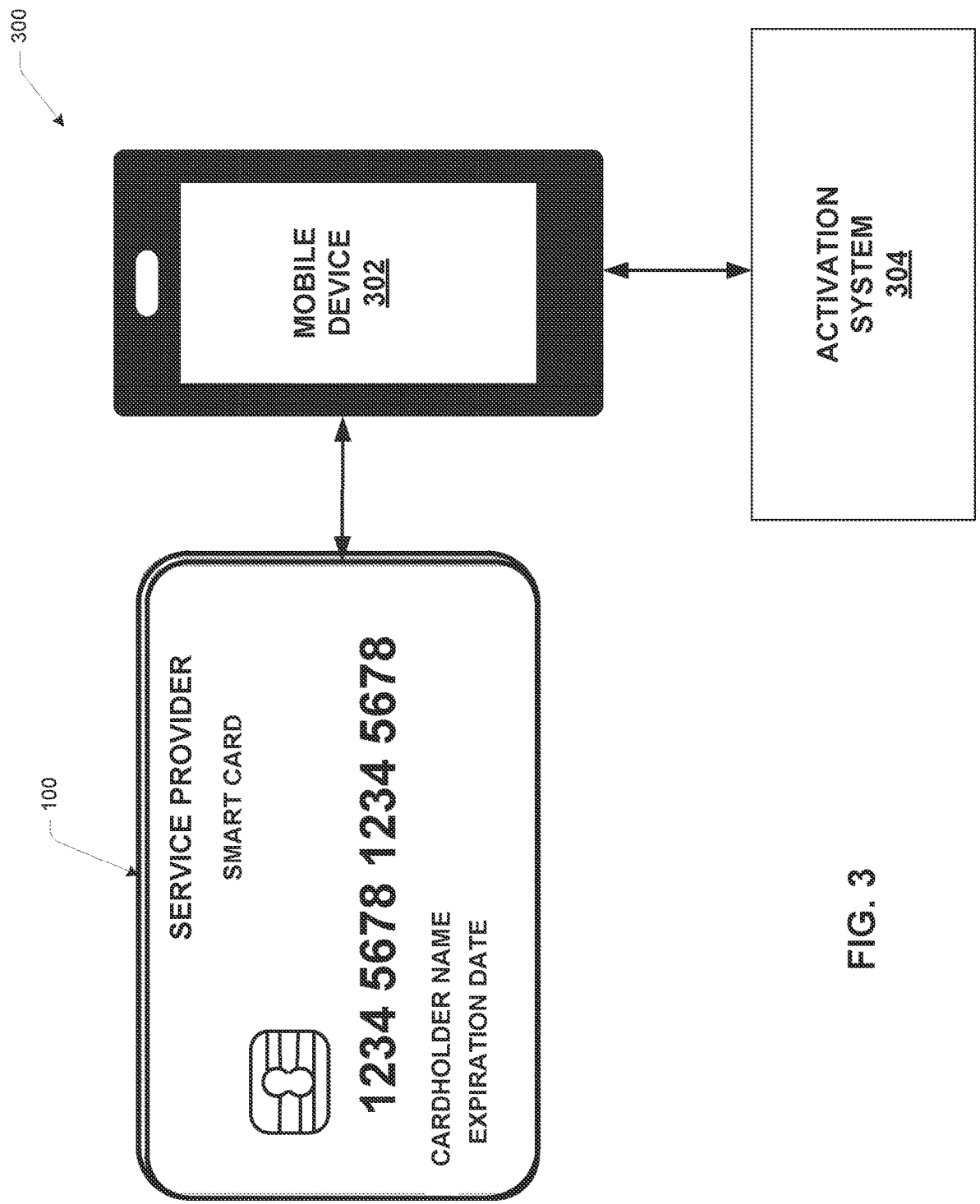

FIG. 3 illustrates an aspect of the subject matter in accordance with embodiments.

Figure 4:
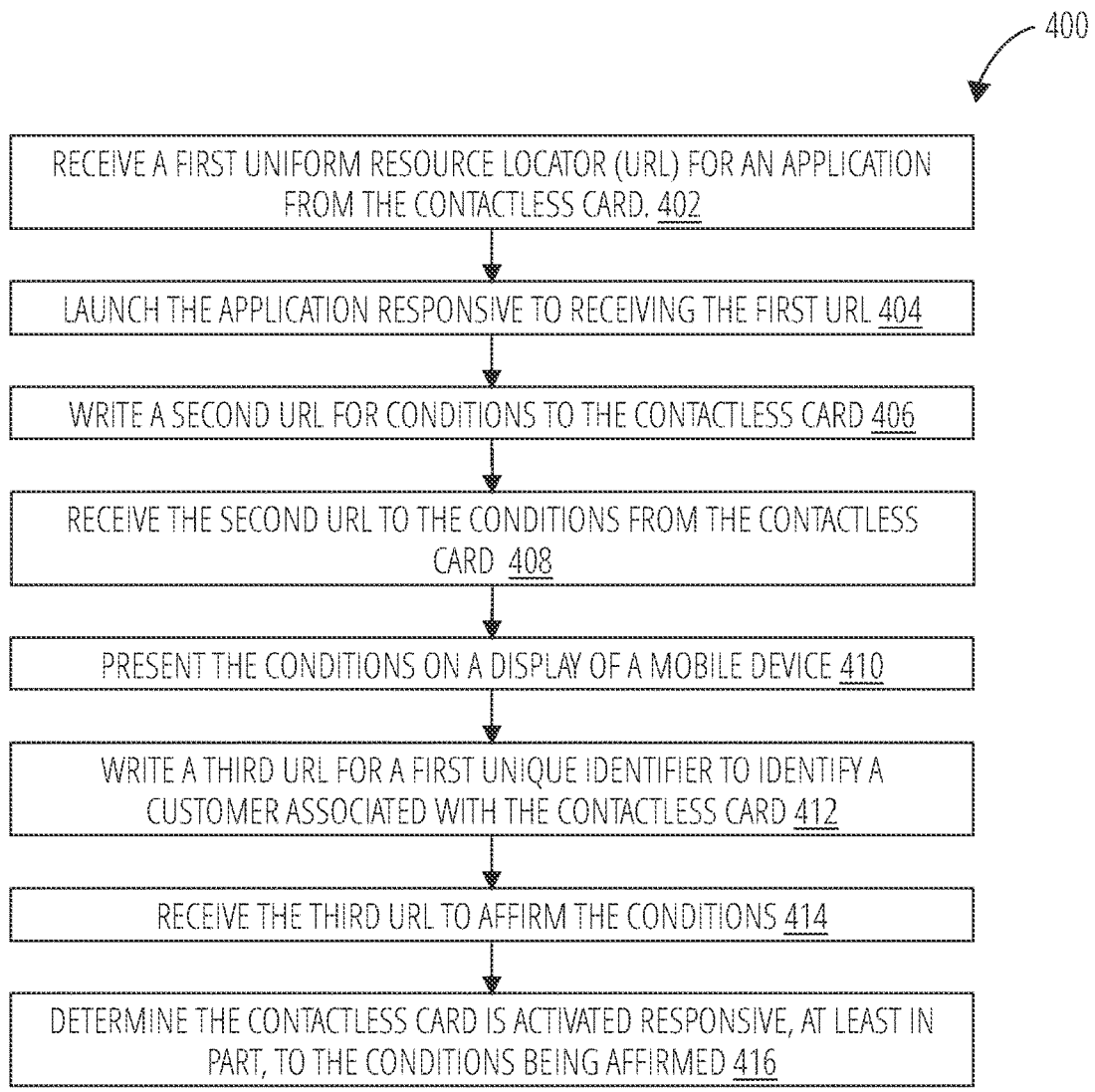

FIG. 4 illustrates a routine 400 in accordance embodiments.

Figure 5:
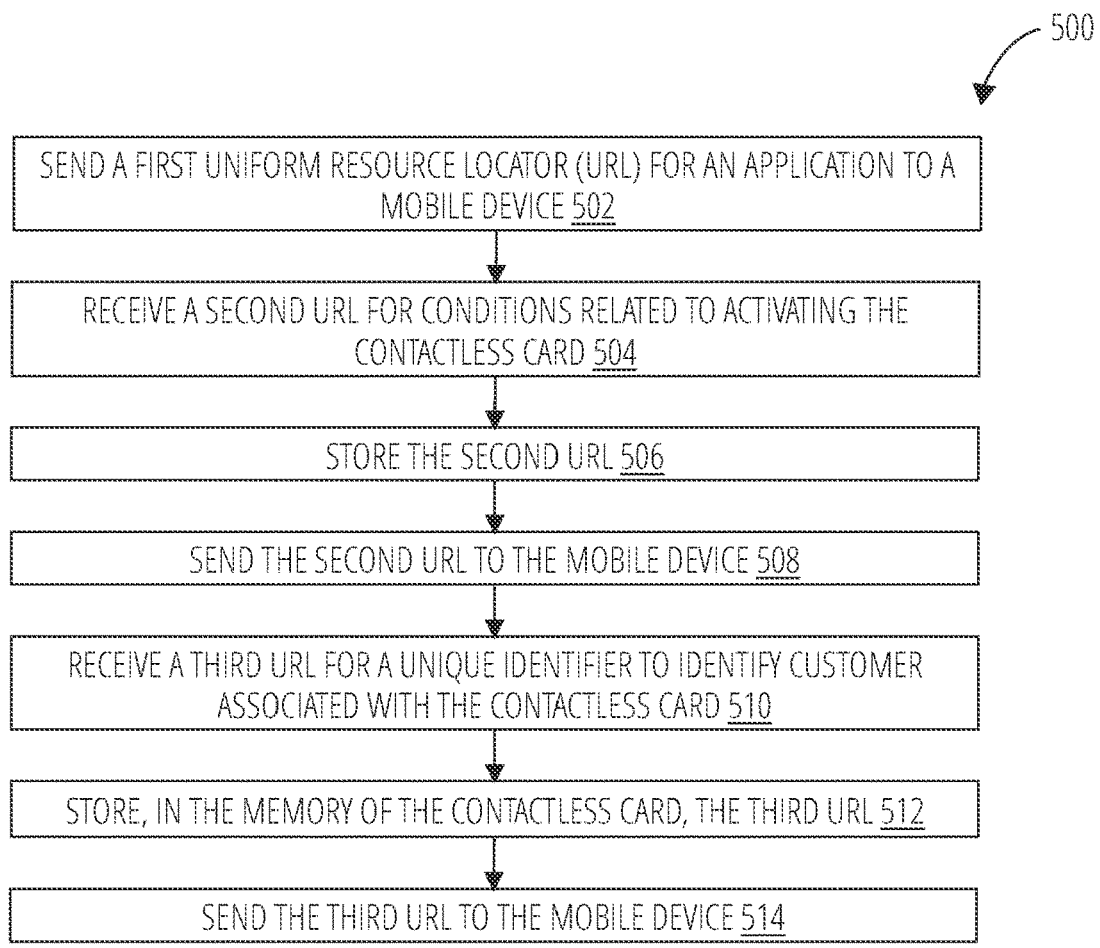

FIG. 5 illustrates a routine 500 in accordance with embodiments.

Figure 6:
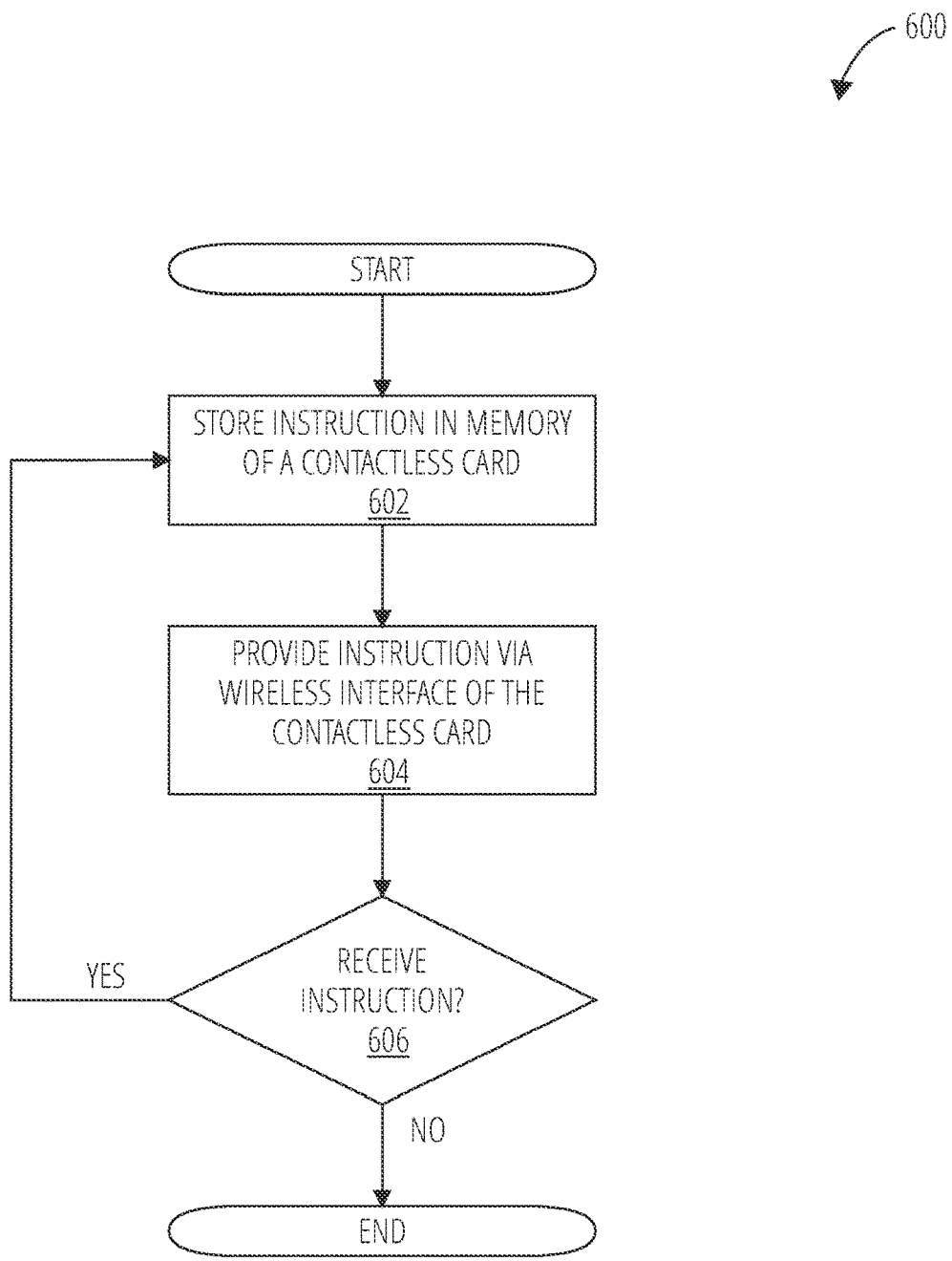

FIG. 6 illustrates a routine 600 in accordance with embodiments.

Figure 7:
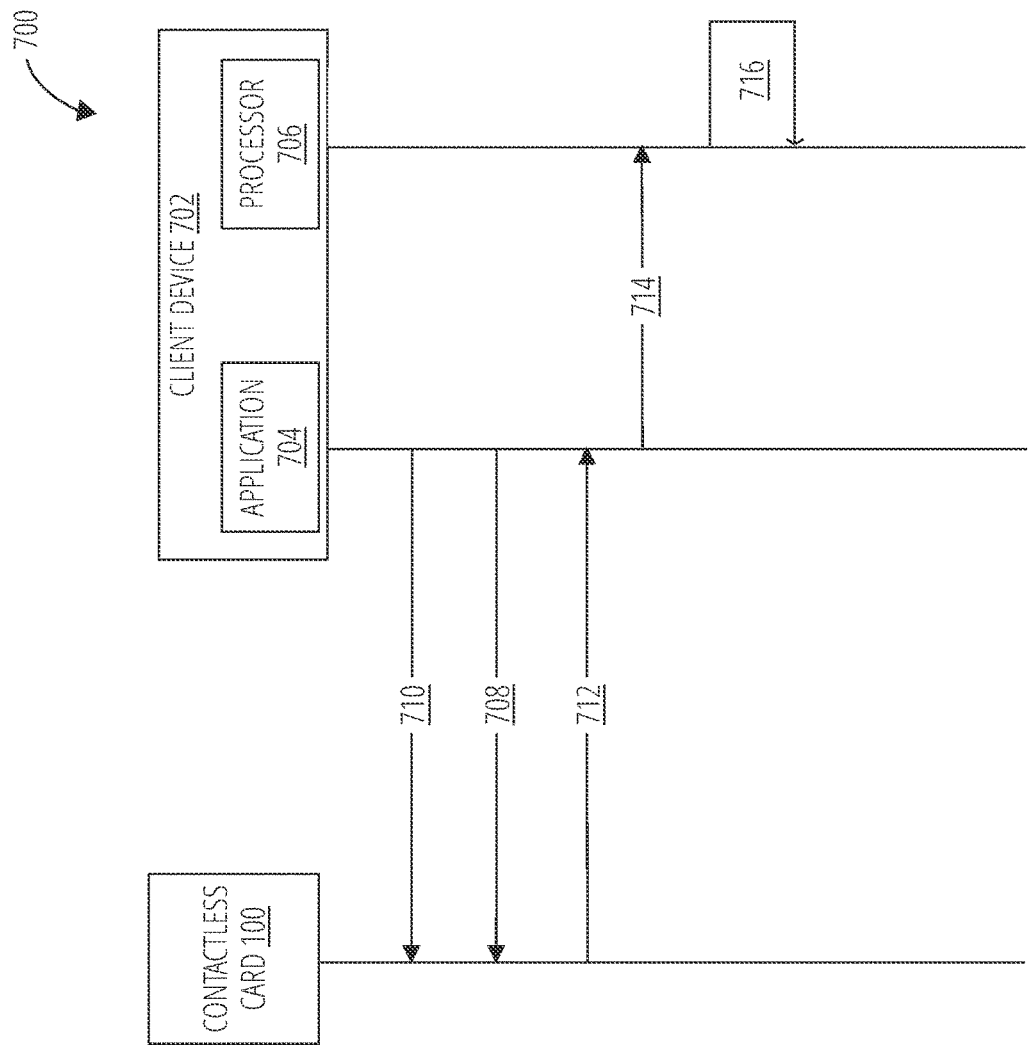

FIG. 7 illustrates a sequence flow 700 in accordance with embodiments.

Figure 8:
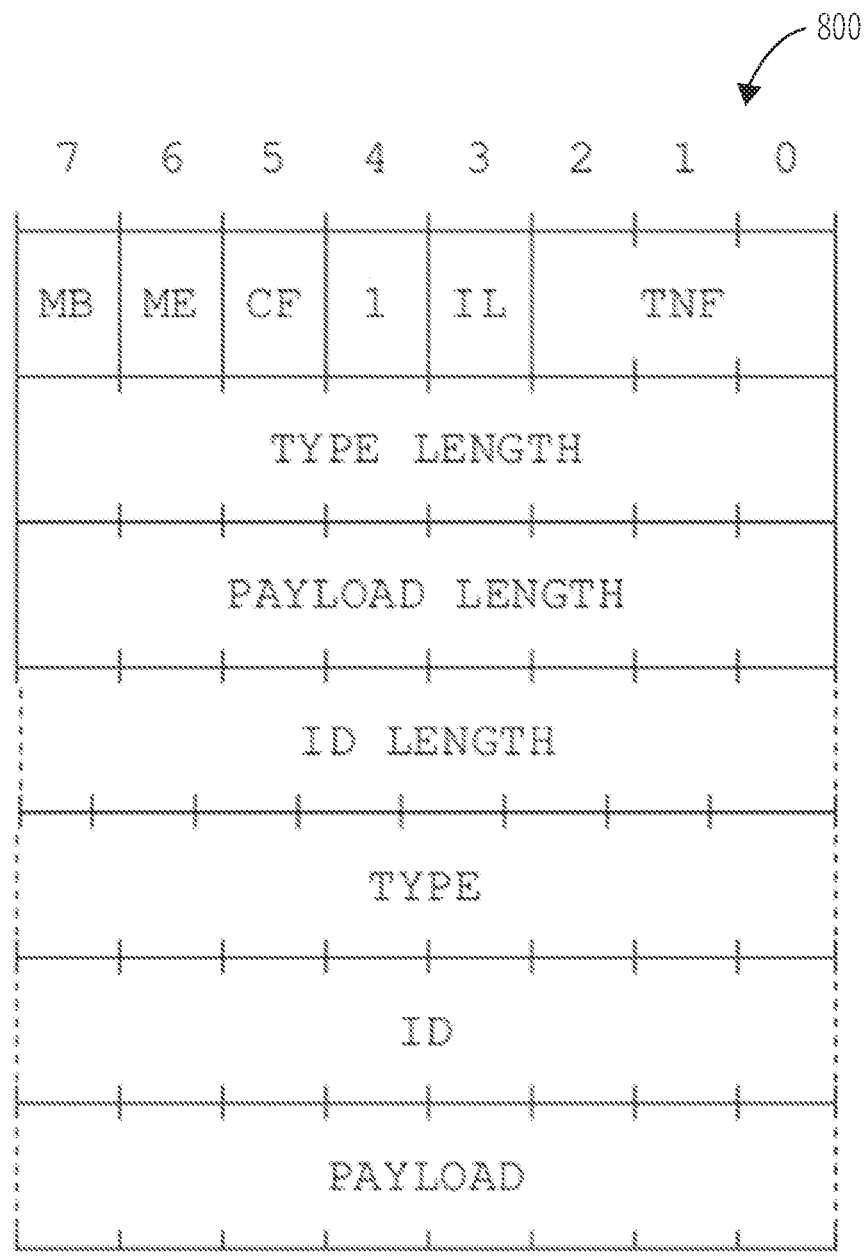

FIG. 8 illustrates a data structure 800 in accordance embodiments.

Figure 9A:
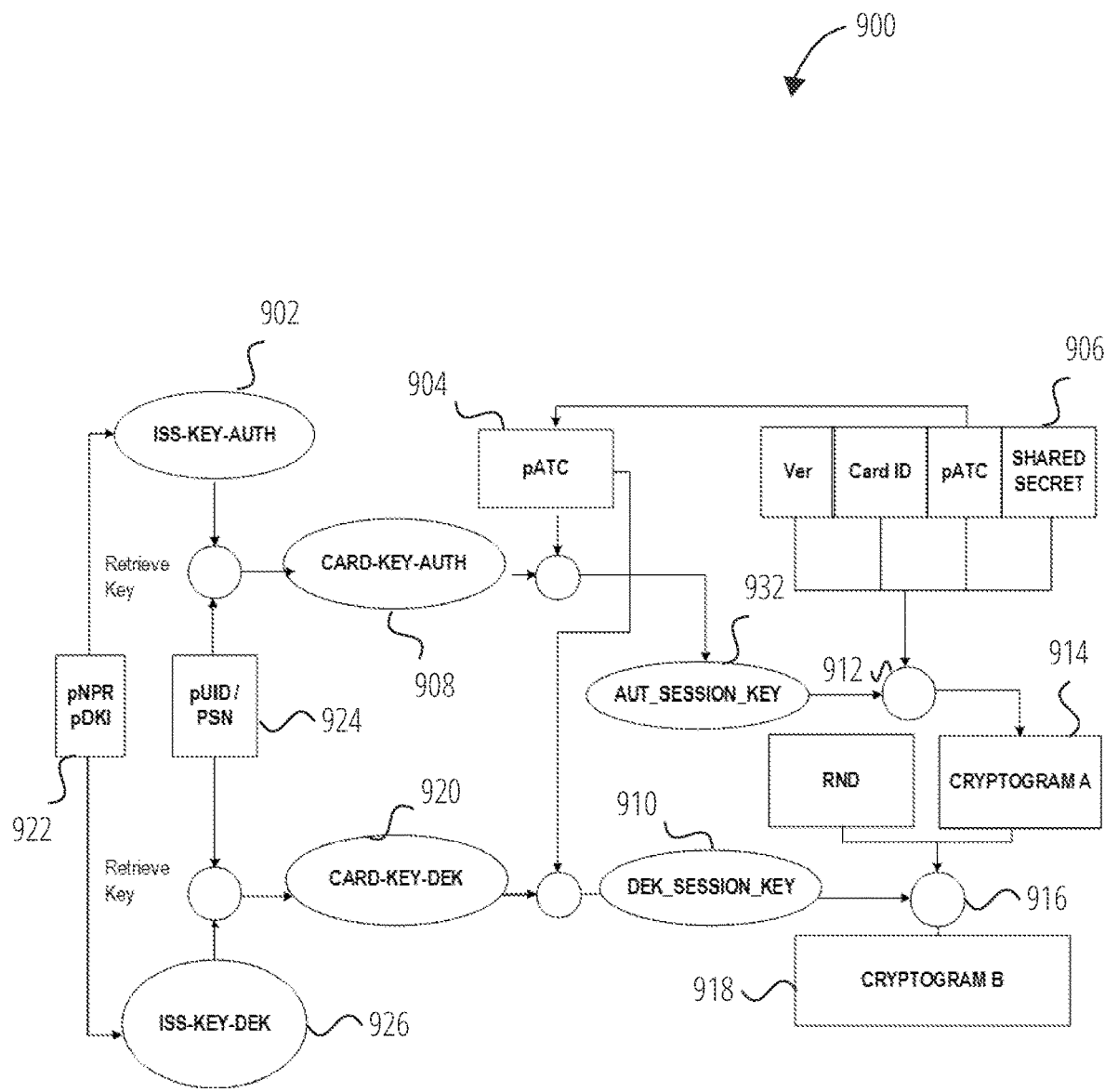

FIG. 9A is a diagram of a key system according to an example embodiment.

FIG. 9B is an embodiment of message formats for cryptogram A and cryptogram B such as the cryptogram A and cryptogram B shown in FIG. 9A.

FIG. 9C is another embodiment of message formats for cryptogram A and cryptogram B such as the cryptogram A and cryptogram B shown in FIG. 9A.

Figure 10:
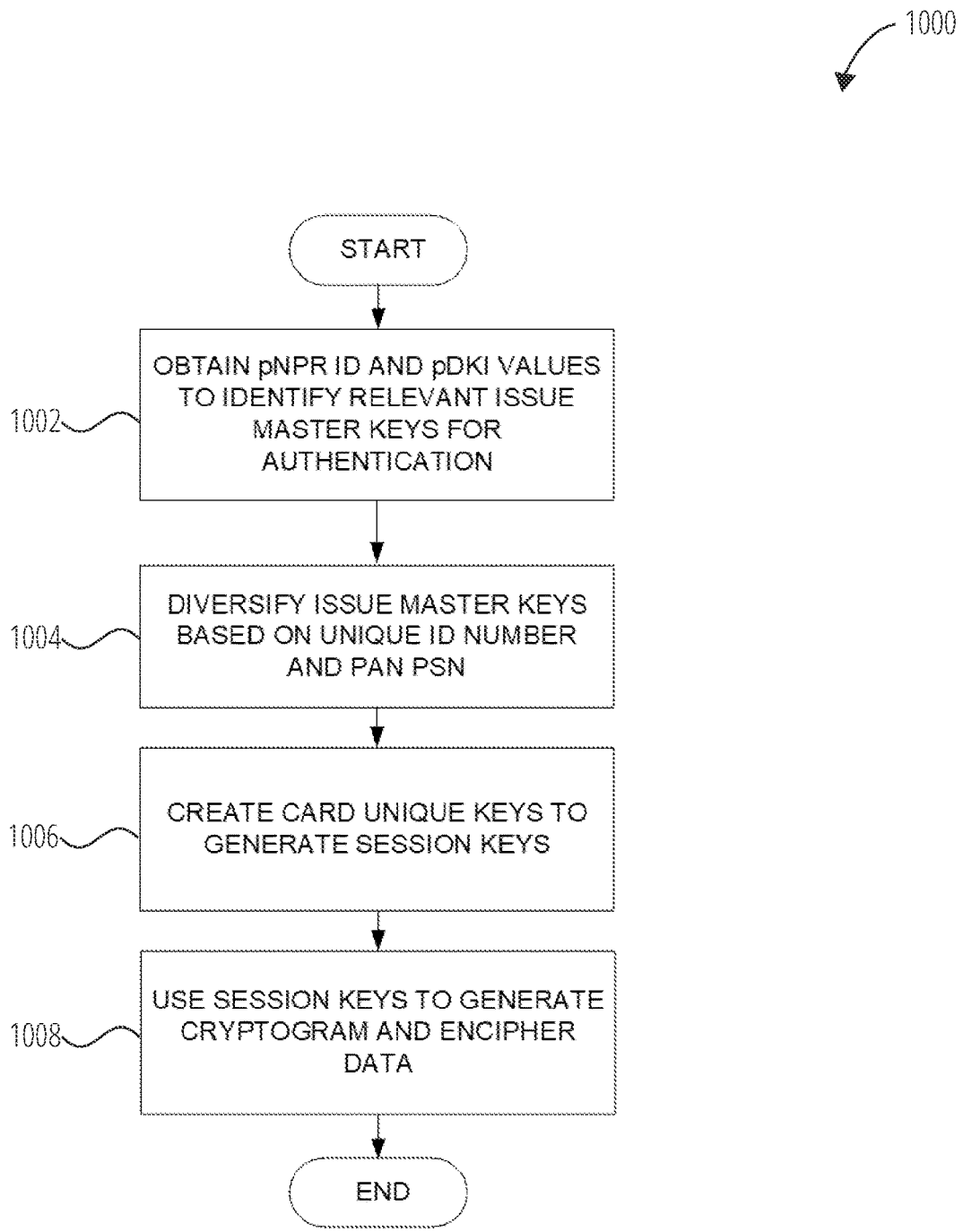

FIG. 10 is a flowchart of a method of generating a cryptogram according to an example embodiment.

Figure 11:
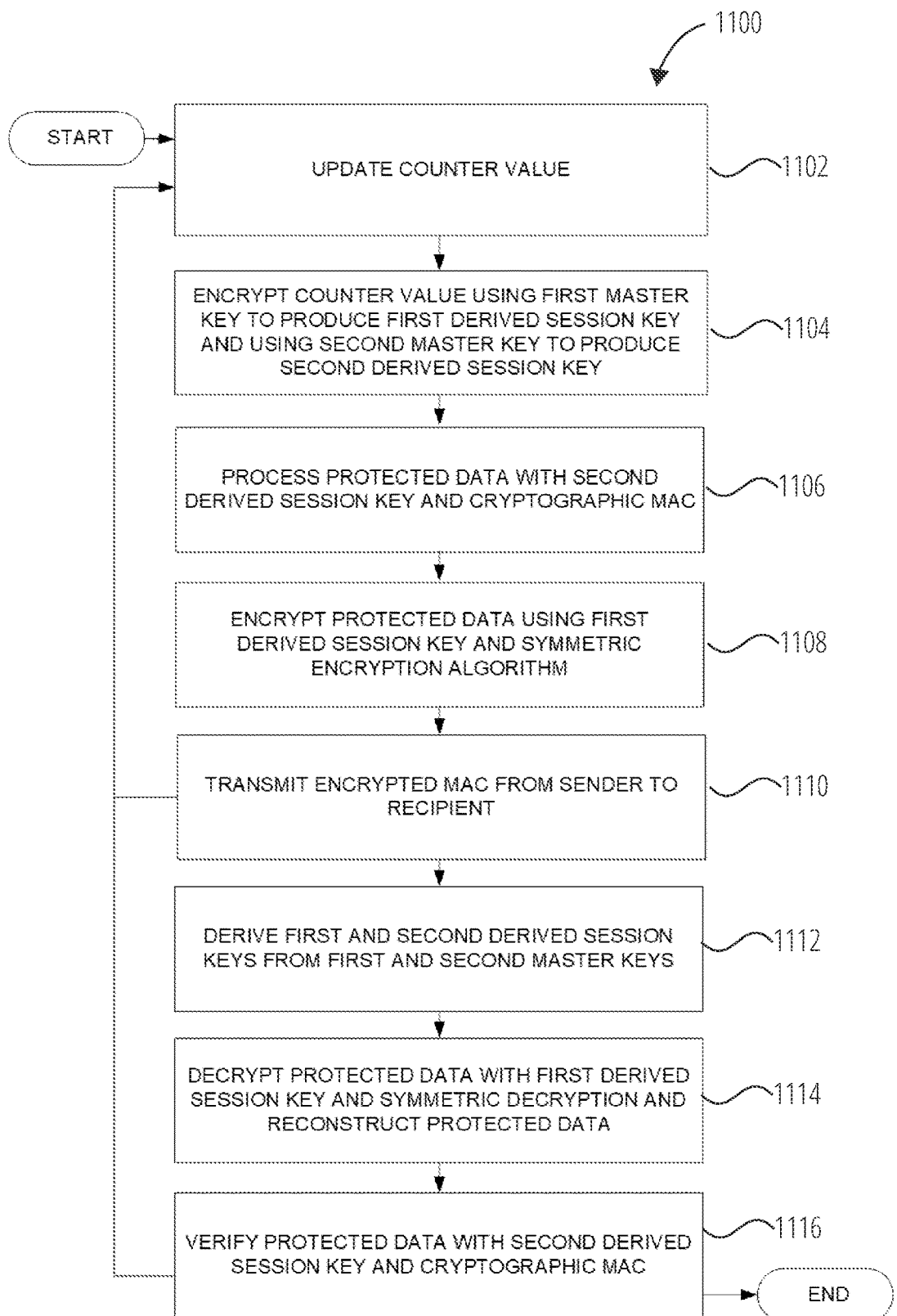

FIG. 11 illustrates an aspect of the subject matter in accordance with embodiments.

Figure 12:
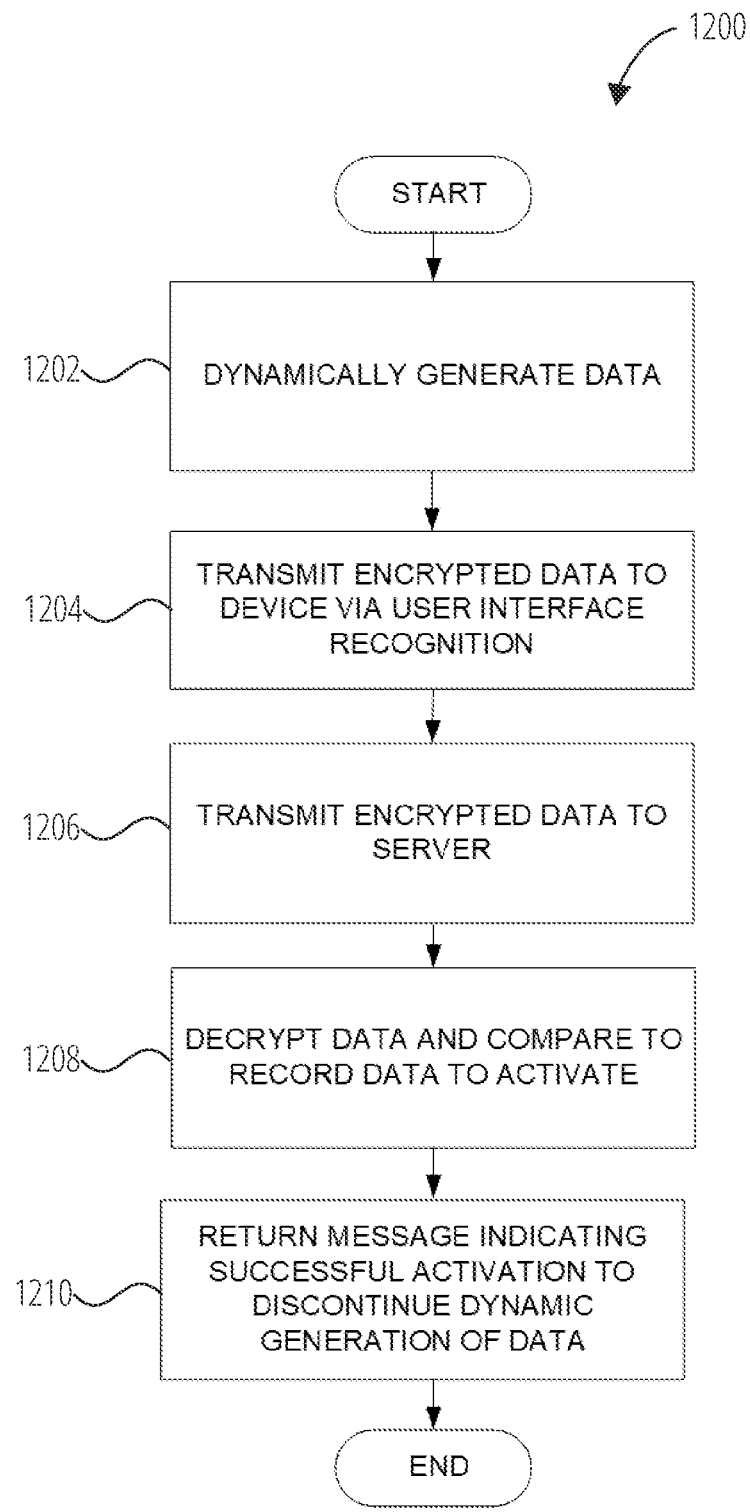

FIG. 12 illustrates an aspect of the subject matter in accordance with embodiments.

DETAILED DESCRIPTION

Embodiments may be generally directed to methods, devices, and systems to perform an activation for contactless cards, such a credit cards and debit cards. Typically, a customer may receive a contactless card in the mail or from a banking branch in a nonactive state. To activate the card, the customer must go through a process, which usually includes calling a telephone number and/or visiting a website. The customer is then required to enter information, such as the account number on the face of the card, and a backend activation system operated and/or controlled by the bank performs an activation sequence to activate the card. However, these current solutions are problematic because they require the customer to enter information and are subject to errors. For example, the customer may incorrectly enter a digit of the account number when entering the number via a telephone keypad or keyboard. In these situations, the activation system typically does not tell the customer of their error for security purposes, and merely ceases the activation attempt, e.g., hangs up on the customer or states that the activation cannot be completed.

Embodiments discussed herein provide improvements for these issues and in one or more technical fields or technology areas, e.g., electronic activation of contactless cards. Embodiments discussed include a customer receiving a contactless card from a card issuer with minimal instructions. For example, the instructions may merely tell the customer to turn on the near-field communication (NFC) interface on their mobile device. The customer may then be instructed to perform a series of taps with the card on and/or near the mobile device to go through steps required to activate the card. Tapping the card on the mobile device ensures that the customer brings the contactless card within operating range of the device and a wireless exchange of information can occur. In one example, the customer may be instructed to tap the contactless card on a surface of the mobile device, such as on display. Bringing the contactless card within range of the mobile device may cause an action or a series of actions to occur to perform an operation, such as activate the contactless card.

In one specific example, the contactless card may be sent to the user programmed with a resource locator, such as a uniform resource locator (URL), a uniform resource identifier (URI), a uniform resource name (URN), or the like. The resource locator may be stored in the memory of the contactless card, for example and may be communicated to the mobile device as part of a read operation performed by the mobile device when the contactless card is brought in range. The mobile device may perform an action based on receiving the resource locator. For example, the resource locator may be a link or instruction to launch an application (app) store or a banking app. The mobile device, upon reception of the resource locator, may launch the app store to download an app, such as a banking app related to the contactless card. In some instances, the app may already be installed on the mobile device and the resource locator may cause the banking app to launch. The mobile device including the app may have the customer go through a series of actions, where the next action is initiated when the card is brought into the wireless communication range of the mobile device. For example, the customer may be instructed to tap the contactless card again to launch a set of terms and conditions to read through once the application is installed/ launched on the mobile device. The customer may provide another tap to accept a term of service for the contactless card and authorize the mobile device to activate the card by communicating with an activation server. Once activated, the card may be in an activated state and then each additional tap may cause the same action to occur, e.g., the banking app is launched to a landing page that may show details relating to the account.

Embodiments discussed herein are not limited to performing an activation process. For example, the operations discussed herein may be used to cause any number of operations or a series of actions to be performed and the contactless cards may be utilized as a state machine to hold instructions for a next step in the series of steps to perform operations. As will become more apparent in the follow description, when the contactless card is brought into wireless operation range of a device, a communication exchange may occur between the device and the card, e.g., read/write operations. For example, the device may read the resource locator from the card and m write a new instruction or resource locator to the memory of the card. The instruction or resource locator may be used by the contactless to hold a state or step in a series of steps to perform an operation. Upon the next read operation, the contactless card may provide the instruction or resource locator to the reading device to cause the next step. These and other details will become more apparent in the follow description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example configuration of a contactless card 100, which may include a transaction card, a payment card, such as a credit card, debit card, or gift card, issued by a service provider as displayed as service provider indicia 102 on the front or back of the contactless card 100. In some examples, the contactless card 100 is not related to a payment card, and may include, without limitation, an identification card. In some examples, the transaction card may include a dual interface contactless payment card, a rewards card, and so forth. The contactless card 100 may include a substrate 108, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 100 may have physical characteristics compliant with the ID-1 format of the ISO/IEC 7816 standard, and the transaction card may otherwise be compliant with the ISO/IEC 14443 standard. However, it is understood that the contactless card 100 according to the present disclosure may have different characteristics, and the present disclosure does not require a transaction card to be implemented in a payment card.

The contactless card 100 may also include identification information 106 displayed on the front and/or back of the card, and a contact pad 104. The contact pad 104 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 100 may also include processing circuitry, antenna and other components as will be further discussed in FIG. 2. These components may be located behind the contact pad 104 or elsewhere on the substrate 108, e.g. within a different layer of the substrate 108, and may electrically and physically coupled with the contact pad 104. The contactless card 100 may also include a magnetic strip or tape, which may be located on the back of the card (not shown in FIG. 1). The contactless card 100 may also include an NFC device coupled with an antenna capable of communicating via the NFC protocol. Embodiments are not limited in this manner.

As illustrated in FIG. 2, the contact pad 104 of contactless card 100 may include processing circuitry 216 for storing, processing, and communicating information, including a processor 202, a memory 204, and one or more interface(s) 206. It is understood that the processing circuitry 216 may contain additional components, including processors, memories, error and parity/CRC checkers, data encoders, anticollision algorithms, controllers, command decoders, security primitives and tamper proofing hardware, as necessary to perform the functions described herein.

The memory 204 may be a read-only memory, write-once read-multiple memory or read/write memory, e.g., RAM, ROM, and EEPROM, and the contactless card 100 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 204 may be encrypted memory utilizing an encryption algorithm executed by the processor 202 to encrypted data.

The memory 204 may be configured to store one or more applet(s) 208, one or more counter(s) 210, a customer identifier 214, and the account number(s) 212, which may be virtual account numbers. The one or more applet(s) 208 may comprise one or more software applications configured to execute on one or more contactless cards, such as a Java® Card applet. However, it is understood that applet(s) 208 are not limited to Java Card applets, and instead may be any software application operable on contactless cards or other devices having limited memory. The one or more counter(s) 210 may comprise a numeric counter sufficient to store an integer. The customer identifier 214 may comprise a unique alphanumeric identifier assigned to a user of the contactless card 100, and the identifier may distinguish the user of the contactless card from other contactless card users. In some examples, the customer identifier 214 may identify both a customer and an account assigned to that customer and may further identify the contactless card 100 associated with the customer's account. As stated, the account number(s) 212 may include thousands of one-time use virtual account numbers associated with the contactless card 100. An applet(s) 208 of the contactless card 100 may be configured to manage the account number(s) 212 (e.g., to select an account number(s) 212, mark the selected account number(s) 212 as used, and transmit the account number(s) 212 to a mobile device for auto filling by an auto filling service.

The processor 202 and memory elements of the foregoing exemplary embodiments are described with reference to the contact pad 104, but the present disclosure is not limited thereto. It is understood that these elements may be implemented outside of the contact pad 104 or entirely separate from it, or as further elements in addition to processor 202 and memory 204 elements located within the contact pad 104.

In some examples, the contactless card 100 may comprise one or more antenna(s) 218. The one or more antenna(s) 218 may be placed within the contactless card 100 and around the processing circuitry 216 of the contact pad 104. For example, the one or more antenna(s) 218 may be integral with the processing circuitry 216 and the one or more antenna(s) 218 may be used with an external booster coil. As another example, the one or more antenna(s) 218 may be external to the contact pad 104 and the processing circuitry 216.

In an embodiment, the coil of contactless card 100 may act as the secondary of an air core transformer. The terminal may communicate with the contactless card 100 by cutting power or amplitude modulation. The contactless card 101 may infer the data transmitted from the terminal using the gaps in the contactless card's power connection, which may be functionally maintained through one or more capacitors. The contactless card 100 may communicate back by switching a load on the contactless card's coil or load modulation. Load modulation may be detected in the terminal's coil through interference. More generally, using the antenna(s) 218, processor 202, and/or the memory 204, the contactless card 101 provides a communications interface to communicate via NFC, Bluetooth, and/or Wi-Fi communications.

As explained above, the contactless card 100 may be built on a software platform operable on smart cards or other devices having limited memory, such as JavaCard, and one or more or more applications or applets may be securely executed. Applet(s) 208 may be added to contactless cards to provide a one-time password or passcode (OTP) for multifactor authentication (MFA) in various mobile application-based use cases. Applet(s) 208 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 208 may be configured to encode the OTP as an NDEF type 4 well known type text tag. In some examples, NDEF messages may comprise one or more records. The applet(s) 208 may be configured to add one or more static tag records in addition to the OTP record.

In some examples, the one or more applet(s) 208 may be configured to emulate an RFID tag. The RFID tag may include one or more polymorphic tags. In some examples, each time the tag is read, different cryptographic data is presented that may indicate the authenticity of the contactless card. Based on the one or more applet(s) 208, an NFC read of the tag may be processed, the data may be transmitted to a server, such as a server of a banking system, and the data may be validated at the server.

In some examples, the contactless card 100 and server may include certain data such that the card may be properly identified. The contactless card 100 may include one or more unique identifiers (not pictured). Each time a read operation takes place, the counter(s) 210 may be configured to increment. In some examples, each time data from the contactless card 100 is read (e.g., by a mobile device), the counter(s) 210 is transmitted to the server for validation and determines whether the counter(s) 210 are equal (as part of the validation) to a counter of the server.

The one or more counter(s) 210 may be configured to prevent a replay attack. For example, if a cryptogram has been obtained and replayed, that cryptogram is immediately rejected if the counter(s) 210 has been read or used or otherwise passed over. If the counter(s) 210 has not been used, it may be replayed. In some examples, the counter that is incremented on the card is different from the counter that is incremented for transactions. The contactless card 101 is unable to determine the application transaction counter(s) 210 since there is no communication between applet(s) 208 on the contactless card 100.

In some examples, the counter(s) 210 may get out of sync. In some examples, to account for accidental reads that initiate transactions, such as reading at an angle, the counter(s) 210 may increment but the application does not process the counter(s) 210. In some examples, when the mobile device 10 is woken up, NFC may be enabled and the device 110 may be configured to read available tags, but no action is taken responsive to the reads.

To keep the counter(s) 210 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 210 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 210 increases in the appropriate sequence, then it possible to know that the user has done so.

The key diversification technique described herein with reference to the counter(s) 210, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 100, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 100. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

In embodiments, the contactless card 100 may store a resource locator 220 in the memory 204. For example, during the creation process, a resource locator 220 used to start an activation process may be written to the memory 204. During the activation process, a device, such as a mobile device, may perform an NDEF read operation to read the resource locator 220. In one example, the contactless card may be initiated with a resource locator 220 that points to an app store to download an app relating to the contactless card. For example, the resource locator 220 may be "https://play.google.com/store/apps/details?id=<package_name>," where package_name may reference the app. In another example, the resource locator 220 may be "http://apps.apple.comi<country>/appi<app—name>/id<store-ID>," where app-name and id are references to download the app. In embodiments, the memory 204 may include both resource locators such that the customer may use any device having the Android® Operating System or Apple® Operating System to activate the contactless card. In some instances, the app may already be installed on the mobile device and the resource locator 220 may cause the operating system of the mobile device to launch the app. For example, upon receiving the resource locator 220 the mobile device may check whether the app is installed and, if so, the operating system will skip the installation process and launch the app.

In embodiments, the contactless card 100 including the resource locator 220 may be utilized as a "state machine," where the next operation in a series of operations may be stored in the resource locator 220 until it is ready to be executed/processed by an external device (mobile device). The resource locator 220 in memory 204 may be updated with a new instruction or locator for the series of operations until the series is complete.

A device, such as a mobile device, may write to the memory 204 using an NDEF write or rewrite instruction to the update the resource locator 220. For example, during the activation process, a mobile device may read the resource locator 220 to install and/or launch an app relating to the contactless card. The mobile device may also perform a write operation to write a new resource locator 220 to the memory 204 for the next operation to be performed. In some embodiments, the next operation may require the customer to review the terms and conditions associated with the contactless card and the mobile device may write a link to the terms and conditions for the resource locator 220 in the memory 204. In one example, the link may be a deep link to a local location within the app on the mobile device. In another example, the link may be an external link (outside of the app) to launch a website in a web browser on the mobile device. Embodiments are not limited to these examples.

In embodiments, once the device receives the resource locator from the contactless card 100, the device may write the next operation as a resource locator to the card. For example, the device may write a unique identifier that may be utilized by a customer to accept the terms and conditions. Specifically, when the customer has read through and is ready to accept the terms and conditions, the customer may bring the contactless card 100 within range of the device, and the device may perform an NFC read operation to read the resource locator including the unique identifier. The device may determine the terms and conditions are accepted and perform an activation with an activation server/system.

The contactless card component 200 including the memory 204 may be updated with one or more resource locators 220 during the activation sequence. Each time, the contactless card 100 is brought within range (NFC range), the resource locator 220 may be updated with a different/new resource locator or instruction to perform the next operation for the activation sequence on the mobile device. A mobile device may perform an NDEF write operation to write a new resource locator 220 into the memory 204. Each of the different resource locators 220 may cause the mobile device to perform different operations, such as downloading/launching an app, presenting the terms and conditions, and accepting the terms and conditions, as previously discussed. Once activated, the resource locator 220 may store an instruction or resource locator to cause the app on the mobile device to initiate to a landing page. For example, the resource locator 220 may cause the app to initiate to a page showing information for the account associated with the contactless card, e.g., account balance, payment activity, transactions, awards/rewards, etc. The contactless card 200 may store the resource locator 220 and cause the app to launch to the landing page until the resource locator 220 is updated with a new instruction to perform another operation.

FIG. 3 illustrates an example system 300 that may be utilized to perform an activation for a contactless card. In the illustrated example, the system 300 includes a contactless card 100, a mobile device 302, and an activation system 304. The components of system 300 may be configured to communicate with each via one or more wired and/or wireless interconnects. For example, the contactless card 100 may be configured to communicate with the mobile device 302 via a wireless interconnect in accordance with a wireless protocol, such as NFC®, Bluetooth®, Wireless Fidelity (WiFi), and so forth. The mobile device 302 may also be configured to communicate with the activation system 304 in accordance wireless and/or wired protocols.

In embodiments, the system 300 may be utilized by a customer to activate the contactless card 100 via the mobile device 302. For example, the contactless card 100 may be configured with a resource locator during creation that causes an operating system on the mobile device 302 to install or initiate an app associated with the contactless card 100. In operation, the contactless card 100 may be provided to the customer with instructions to turn on a short-range radio on the mobile device 302, such as an NFC interface, and bring the contactless card 100 within range of the mobile device 302. The range may be the operating range for the short-range radio satisfied by tapping the card on the mobile device 302. In one example, the range may be the operating range in accordance with the NFC standard. The mobile device 302 may detect the contactless card 100 and perform an exchange with the contactless card 100 to establish communications, e.g., an NFC exchange.

The mobile device 302 communicating with the contactless card 100 may perform a read operation (NFC read) to read data from the memory of the contactless card 100. In embodiments, the read operation may refer to a memory location or another identifier to read a resource locator stored in the memory. The contactless card 100 including circuitry may process the read operation, retrieve the resource locator from memory, and provide the resource locator to the mobile device 302. The mobile device 302 may process the data including the resource locator received from the contactless card 100. In this example, the operating system of the mobile device 302 may launch an app store to download a banking app or initiate the banking app if the app is already installed on the mobile device 302.

In some instances, a customer may be required to perform a number of steps to perform the activation of the contactless card 100. The mobile device 302 may write a new resource locator into the memory of the contactless card 100 to perform each new operation. For example, in response to initiating the app on the mobile device 302, the mobile device 302 including the app may write (NFC write operation) a new resource locator to the memory of the contactless card 100. The new resource locator may be an instruction or a link (deep link) pointing to terms and conditions associated with the contactless card 100. Thus, the next time the contactless card 100 is brought into communication range of the mobile device 302, the mobile device 302 may perform another NFC read operation, receive the updated resource locator from the contactless card 100 and perform one or more operations to process the resource locator. For example, the mobile device 302 may process the resource locator, which may cause the app to present the terms and conditions in a graphical user interface (GUI) on a display of the banking app or a web browser of the mobile device 302.

In embodiments, the contactless card 100 may be used to authenticate the user and accept the terms and conditions. For example, the mobile device 302 may obtain a unique identifier associated with the customer. The mobile device 302 may require the customer to enter a credential, such as a password, a unique pattern, a biometric, a passcode, etc., and the mobile device 302 may obtain and/or generate a unique identifier for the customer based on the entered credential. In some instances, the mobile device 302 may generate a random alphanumeric sequence for the unique identifier. Embodiments are not limited in this manner.

The mobile device 302 may perform a write operation to write a new resource locator including the unique identifier. Once the customer is ready to accept the terms and conditions, the mobile device 302 may instruct the customer to bring the card within range. The mobile device 302 may perform a read operation to read the resource locator including the unique identifier and activate the contactless card 100.

To perform the activation, the mobile device 302 may communicate data with the activation system 304. The data may include information to identify the customer, identify the contactless card 100, confirm the terms and conditions are accepted, and so forth. The activation system 304 may process the data and confirm that the contactless card 100 is activated or failed activation to the mobile device 302. The mobile device 302 may display information in the app GUI indicating whether the contactless card 100 is activated or not activated.

In some instances, the contactless card 100 may generate and communicate the unique identifier with an OTP to perform authentication operations. For example, to accept the terms and conditions and/or launch the banking app to a landing page with sensitive information, the mobile device 302 may instruct the customer to bring the contactless card 100 within range of the mobile device 302. Once in range, the contactless card 100 and mobile device 302 may perform an NFC exchange. For example, the contactless card 100 including instructions may be configured to respond to one or more requests, such as near field data exchange requests, from a mobile NFC reader of the mobile device 302 and produce an NDEF message that includes a cryptographically secure OTP encoded as an NDEF text tag with the unique identifier. One example of an NDEF OTP is an NDEF short-record layout (SR=1). In such an example, one or more the card instructions may be configured to encode the OTP as an NDEF type 4 well known type text tag. In some examples, NDEF messages may include one or more records. The instructions may be configured to add one or more static tag records in addition to the OTP record.

In embodiments, the contactless card 100 may be activated and the resource locator may be set with the unique identifier to use with an OTP to perform authentication on each read operation. For example, each time the contactless card 100 is brought into range of the mobile device 302, the mobile device 302 may receive the OTP with the unique identifier encrypted and perform an authentication operation. If authenticated, the mobile device 302 may cause an action to occur, such as the launching the app to the landing page including the account balance and/or other information relating to the bank account.

FIG. 4 illustrates an example routine 400 that may be performed by a mobile device 302 to activate a contactless card 100. In block 402, the routine 400 includes receiving a first uniform resource locator (URL) for an application from the contactless card via a wireless interface. In embodiments, the application may be a banking app and configured to perform the activation. The first URL may be stored in the memory of the contactless card 100 and communicated to the mobile device 302 as part of a NDEF exchange including an NDEF read. The first URL may be processed by the operating system of the mobile device 302 and cause one or more events. Specifically, at block 404, the routine 400 includes launching the application responsive to receiving the first URL. In some instances, the app may be installed on the mobile device 302 and upon receiving the first URL, the operating system may cause the app to execute. In other instances, the app may not be installed on the mobile device 302. In these instances, the operating system may cause an app store to launch and the first URL may include information to direct the app store to a download page for the banking app. Embodiments are not limited in this manner.

At block 406, the routine 400 includes writing a second URL for conditions to the contactless card. In embodiments, the second URL may include a link, such as deep link or web link, to a location to cause the terms and conditions to be presented to the user on a display of the mobile device 302. The mobile device 302 may determine the second URL from the app, which may be a deep link stored locally within the files for the app. The app, upon being launched to perform an activation for a contactless card, may provide the deep link to the operating system and the operating system may generate a message, such as a "Write NDEFMessage message," including the deep link as the second URL to write to the contactless card. In other instances, the app may provide a link to a website, or a page of a website that can be accessed through a web browser. The operating system may write the website/page link to the contactless card using the NDEF message. The contactless card may store the second URL in memory until the next operation is ready to be performed for the activation sequence, e.g., the customer is ready to view the terms and conditions by bringing the card within range of the mobile device again.

In block 408, the routine 400 includes receiving the second URL to the conditions from the contactless card. In some instances, the app may present in a GUI on the display of the mobile device 302 instructions for the user to bring the contactless card within range of the mobile device 302 to read the terms and conditions, e.g., an instruction for the customer to tap the contactless card on the display. The mobile device 302 may perform a read operation. In response to the read operation, the mobile device 302 may receive the second URL from the contactless card in an NDEF message. The operating system of the mobile device 302 may process the second URL including causing the app or a web browser to open and display the terms and conditions. As mentioned, the second URL may be a link to a location within the app itself or to a website/page. Further and at block 410, the routine 400 includes presenting the conditions on a display of the mobile device. The terms and conditions may be presented in a GUI and are readable by the customer. The customer may then read the terms and conditions.

In block 412, the routine 400 includes writing a third URL for a unique identifier to identify a customer associated with the contactless card. The third URL including the unique identifier can be used by the mobile device 302 to identify the customer when the customer accepts the terms and conditions and to activate the card. The unique identifier may be any combination of alphanumeric symbols. In some instances, the unique identifier may be based on information relating to the contactless card, e.g., the account number, a zip code, an address, etc. and/or a credential entered by the customer. However, in other instances, the unique identifier may be completely random and generated by the app and/or operating system.

In block 414, the routine 400 includes receiving the third URL to affirm the conditions. In some instances, the app may present the terms and conditions to the customer in a display and include instructions for the customer to bring the contactless card within range of the mobile device 302 to accept the terms and conditions. In one example, the instructions may instruct the customer to tap the contactless card on the mobile device 302. The mobile device 302 may perform a read operation when the contactless card is within range. The mobile device 302 including the app may receive the third URL including the unique identifier to ensure that the same customer/card is being used to accept the terms and conditions. If the received unique identifier matches the previously written (block 412) unique identifier, the app may determine the customer accepted the terms and conditions.

In embodiments, the mobile device 302 may activate the contactless card once the customer accepts the terms and conditions. For example, the mobile device 302 including the app may communicate with the activation system 304 to activate the contactless card. In some examples, the mobile device 302 may communicate information indicating that the customer accepted the terms and conditions to the activation system 304 and information to identify the contactless card being activated. The information to identify the card may include an identifier associated with the customer (username), the account number for the contactless card, or other identifying information. The activation system 304 may utilize the information and activate the contactless card for use to perform transactions. At block 416, routine 400 includes determining the contactless card is activated responsive, at least in part, to the conditions being affirmed. In one example, the mobile device 302 may receive an indication from the activation system 304 indicating that the contactless card has been activated or if the activation failed. The mobile device 302 may notify the customer, e.g., by presenting information on the display, as to whether the contactless card is activated or not activated. In some instances, when the activation has failed, the app may present instructions to the customer how to fix the failed activation attempt.

In embodiments, once the card is activated, the customer may utilize the contactless card with the mobile device 302 to launch the app to a landing page or to perform another action. For example, for each additional instance that the card is brought within range of the mobile device 302, the operating system may make a detection and launch the app. The mobile device 302 may also perform a read operation and the contactless card may send information to the mobile device 302. In one example, the contactless card may generate a cryptogram which may include the unique identifier and an OTP and communicate in the cryptogram to the mobile device 302. The mobile device 302 may use the unique identifier and the OTP to authenticate the user and cause the landing page including sensitive information to be presented to the user.

FIG. 5 illustrates an example routine 500 that may be performed by a contactless card 100 to activate the contactless card 100 via the mobile device 302. In block 502, the routine 500 includes sending a first uniform resource locator (URL) for an application to a mobile device. In embodiments, the contactless card may send the first URL to the mobile device 302 responsive to a read operation via a wireless interface, such as an NFC interface. The first URL may be stored in a memory of the contactless card. The contactless card including circuitry may retrieve the first URL from the memory and communicate it to the mobile device 302 in a NDEF message. In some instances, the first URL may be a link to launch an app on the mobile device 302. In some instances, when the app is not installed on the mobile device 302, the mobile device 302 may launch an app store responsive to receiving the first URL.

In block 504, the routine 500 includes receiving a second URL for conditions related to activating the contactless card. The second URL may be received by the contactless card from the mobile device 302. In some instances, the mobile device 302 may perform an NFC write operation to write the second URL to the memory of the contactless card. The second URL may include a link to terms and conditions that are associated with the contactless card and may be included in an NDEF message. At block 506, the routine 500 includes storing, in the memory, the second URL by the contactless card.

In block 508, the routine 500 includes sending the second URL to the mobile device. In embodiments, the second URL may be communicated by the contactless card responsive to another read operation performed by the mobile device 302. The contactless card may send the second URL in an NDEF message to the mobile device 302. In embodiments, a read operation may be performed when the contactless card is brought into a wireless operating range of the mobile device 302, as previously discussed.

In block 510, the routine 500 receiving a third URL for a unique identifier to identify customer associated with the contactless card. The third URL may be received by the contactless card responsive to a write operation performed by the mobile device 302. Similar to the read operation, the write operation may be performed when the contactless card is brought into the wireless range of the mobile device 302. In some embodiments, a read and write operation may be performed as part of exchange during the same instance. For example, a customer may bring the contactless card within range of the mobile device 302 and the mobile device 302 may perform a read operation, as discussed in the block 508, to read the second URL. The mobile device 302 may determine that the resource locator 220 needs to be updated and may perform a write operation to write the third URL to the memory of the contactless card. The exchange may occur during a single instance when the customer brings the contactless card within the wireless range. Further and at block 512, the routine 500 includes storing, in the memory of the contactless card, the third URL.

At block 514, the routine 500 includes sending the third URL to the mobile device. In embodiments, the contactless card may send the third URL responsive to the contactless card being brought into a wireless range of the mobile device 302, as previously. In this instance, the customer may bring contactless card in range of the mobile device 302 responsive to instructions presented to the customer on the mobile device 302 and to accept or affirm the terms and conditions. The third URL may include a unique identifier that may be used by the mobile device 302 to confirm that the correct card/customer is affirming the terms and conditions. The third URL may be communicated to the mobile device 302 as part of a read operation and in an NDEF message.

Techniques discussed herein are not limited to performing an activation sequence for a contactless card and may be utilized to perform different operations or a sequence of action by utilize the contactless card as a "state machine." For example, a device with NFC read and write capabilities may utilize the memory of the contactless card to store data, such as an instruction or a block of instructions, as resource locators. The device may write the data as a resource locator to the memory of the contactless card to store a state in a sequence of actions or operations to be performed, for example. When the next action is to be performed, the device may read the resource locator and perform the next action based on what is stored in the memory. The device may write data including the next instruction(s) as a resource locator to the memory of the contactless card. This process may be repeated until the sequence of actions is completed. In some instances, the contactless card may include an OTP with a resource locator when it is being read such that the device may confirm and/or authenticate a user. The data communicated between the contactless card and the device may be communicated in a raw format or in encrypted format in NDEF message.

FIG. 6 illustrates an example routine 600 performed by a contactless card store data as a resource locator to perform operations in a sequence of actions or operations and the contactless card may be utilized as a state machine to perform operations. At block 602, the routine 600 includes storing an instruction or data in the memory of the contactless card. For example, a device, such as a mobile device or a point-of-sale (POS) terminal, may write data including instruction(s) as a resource locator in the memory of the contactless card. The data may be an instruction(s) to perform one or more operations to complete the sequence of operations. The device may perform an NFC write operation to write the data to the memory utilizing a short-range radio, such as NFC and in and NDEF message. The contactless card may store the data in the memory until the next read operation and/or until the data is overwritten. The data or instructions in the resource locator may include any operation that may be perform by a computing device. In an example, the data may be a link to a location, e.g., a web link or a link/pointer to a memory location. In another example, the data may be a computer instruction that may be executed and/or performed on a device. The instruction may be a high-level instruction, such as those utilized in scripting language, that may be executed by a device, or a low-level instruction, such as C code, JAVA code, assembly code, etc. Embodiments are not limited in this manner.

At block 604, the routine 600 includes providing the data to the device. For example, the device may execute an NFC read operation and the contactless card may generate an NDEF message to communicate the data to the device. In some embodiments, the data may be communicated in a cryptogram, as discussed herein. The data may be used by the device and cause an operation to be performed.

At block 606, the routine 600 includes determining whether new data including instruction(s) is received. For example, the contactless card may detect a write operation initiated by the device to write the new data including the next instruction(s) for the sequence of actions. If new data is detected, the contactless card may store the data in memory as indicated by the routine 600. If new data is not detected the routine 600 may end until another write operation is performed.

Routine 600 may be used to perform any type of sequence of operations by a device, such as completing a transaction by a POS terminal and/or on a mobile device, make payments via a banking app, change settings on a banking app, and so forth. Embodiments are not limited to these examples.

FIG. 7 is a timing diagram illustrating an example sequence for providing authenticated access according to one or more embodiments of the present disclosure. Sequence flow 700 may include contactless card 100 and client device 702, which may include an application 704 and processor 706. In some embodiments, the client device 702 may be a mobile device 302. In some instances, the follow sequence may be performed between the mobile device 302 and a contactless card 100 to perform one or more of the activation steps and/or authenticate a customer to launch an app to a landing page on the mobile device 302, as previously discussed with regards to FIG. 3.

At line 710, the application 704 communicates with the contactless card 100 (e.g., after being brought near the contactless card 100). Communication between the application 704 and the contactless card 100 may involve the contactless card 100 being sufficiently close to a card reader (not shown) of the client device 702 to enable NFC data transfer between the application 704 and the contactless card 100.

At line 708, after communication has been established between client device 702 and contactless card 100, contactless card 100 generates a message authentication code (MAC) cryptogram. In some examples, this may occur when the contactless card 100 is read by the application 704. In particular, this may occur upon a read, such as an NFC read, of a near field data exchange (NDEF) tag, which may be created in accordance with the NFC Data Exchange Format. For example, a reader application, such as application 704, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 100 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator or locator (e.g., as a formatted string). For example, the MAC cryptogram may include the resource locator including the unique identifier. In some examples, application 704 may be configured to transmit a request to contactless card 100, the request comprising an instruction to generate a MAC cryptogram.

At line 712, the contactless card 100 sends the MAC cryptogram to the application 704. In some examples, the transmission of the MAC cryptogram occurs via NFC, however, the present disclosure is not limited thereto. In other examples, this communication may occur via Bluetooth, Wi-Fi, or other means of wireless data communication. At line 714, the application 704 communicates the MAC cryptogram to the processor 706.

At line 716, the processor 706 verifies the MAC cryptogram pursuant to an instruction from the application 122. For example, the MAC cryptogram may be verified, as explained below. In some examples, verifying the MAC cryptogram may be performed by a device other than client device 702, such as a server of a banking system in data communication with the client device 702. For example, processor 706 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

FIG. 8 illustrates an NDEF short-record layout (SR=1) data structure 800 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well-known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

FIG. 9A illustrates a diagram of a system 900 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 902, 926 may be required for each part of the portfolio on which the one or more applets is issued. For example, the first master key 902 may comprise an Issuer Cryptogram Generation/Authentication Key (Iss-Key-Auth) and the second master key 926 may comprise an Issuer Data Encryption Key (Iss-Key-DEK). As further explained herein, two issuer master keys 902, 926 are diversified into card master keys 908, 920, which are unique for each card. In some examples, a network profile record ID (pNPR) 522 and derivation key index (pDKI) 924, as back office data, may be used to identify which Issuer Master Keys 902, 926 to use in the cryptographic processes for authentication. The system performing the authentication may be configured to retrieve values of pNPR 922 and pDKI 924 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 908 and Card-Key-Dek 920). The session keys (Aut-Session-Key 932 and DEK-Session-Key 910) may be generated by the one or more applets and derived by using the application transaction counter (pATC) 904 with one or more algorithms. To fit data into the one or more algorithms, only the 2 low order bytes of the 4-byte pATC 904 is used. In some examples, the four byte session key derivation method may comprise: F1:=PATC(lower 2 bytes)||'F0'||'00' II PATC (four bytes) F1:=PATC(lower 2 bytes)||'0F'||'00' II PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 904 counter. At each tap of the contactless card, pATC 904 is configured to be updated, and the card master keys Card-Key-AUTH 508 and Card-Key-DEK 920 are further diversified into the session keys Aut-Session-Key 932 and DEK-Session-KEY 910. pATC 904 may be initialized to zero at personalization or applet initialization time. In some examples, the pATC counter 904 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 932. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 932, as explained above. As explained above, the low order two bytes of the counter may be used to diversify for the one or more MAC session keys. As explained below, AUT-Session-Key 932 may be used to MAC data 906, and the resulting data or cryptogram A 914 and random number RND may be encrypted using DEK-Session-Key 910 to create cryptogram B or output 918 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 910 derived from the Card-Key-DEK 920. In this case, the ATC value for the session key derivation is the least significant byte of the counter pATC 904.

The embodiment in FIG. 9B represents a binary version example embodiment of cryptogram A 914 and cryptogram B 918 shown in FIG. 9A including message formats cryptogram A 914-1 and cryptogram B 918-1. Further, in some examples, the first byte may be set to ASCII 'A'.

Another exemplary embodiment is shown in FIG. 9C of cryptogram A 914 and cryptogram B 918 shown in FIG. 9A including message formats cryptogram A 914-2 and cryptogram B 918-2. In this example, the tag may be encoded in hexadecimal format.

The UID field of the received message may be extracted to derive, from master keys Iss-Key-AUTH 502 and Iss-Key-DEK 926, the card master keys (Card-Key-Auth 908 and Card-Key-DEK 920) for that particular card. Using the card master keys (Card-Key-Auth 508 and Card-Key-DEK 920), the counter (pATC) field of the received message may be used to derive the session keys (Aut-Session-Key 932 and DEK-Session-Key 910) for that particular card. Cryptogram B 918 may be decrypted using the DEK-Session-KEY, which yields cryptogram A 914 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 914, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 932. The input data 906 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 912, data 906 is processed through the MAC using Aut-Session-Key 932 to produce MAC output (cryptogram A) 914, which is encrypted.

In order to provide additional protection against brute force attacks exposing the keys on the card, it is desirable that the MAC cryptogram 914 be enciphered. In some examples, data or cryptogram A 914 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 910. In the encryption operation 916, data or cryptogram A 914 and RND are processed using DEK-Session-Key 510 to produce encrypted data, cryptogram B 918. The data 914 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 10 illustrates a method 1000 for generating a cryptogram. For example, at block 1002, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1004, Issuer Master Keys may be diversified by combining them with the card's unique ID number (pUID) and the PAN sequence number (PSN) of one or more applets, for example, a payment applet.

At block 1006, Card-Key-Auth and Card-Key-DEK (unique card keys) may be created by diversifying the Issuer Master Keys to generate session keys which may be used to generate a MAC cryptogram.

At block 1008, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

FIG. 11 depicts an exemplary process 1100 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1102, and other data, such as data to be protected, which it may secure share with the recipient.

At block 1104, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1106, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1108, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1110, the encrypted MAC is transmitted, from the sender to the recipient, with sufficient information to identify additional secret information (such as shared secret, master keys, etc.), for verification of the cryptogram.

At block 1112, the recipient uses the received counter value to independently derive the two derived session keys from the two master keys as explained above.

At block 1114, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1116, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1102) and a new set of session keys may be created (at block 1110). In some examples, the combined random data may be discarded.

FIG. 12 illustrates a method 800 for card activation according to an example embodiment. For example, card activation may be completed by a system including a card, a device, and one or more servers. The contactless card, device, and one or more servers may reference same or similar components that were previously explained a, such as contactless card 100, client device 702, and a server.

In block 1202, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1204, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1206, the one or more portions of the data may be communicated to one or more servers, such as a card issuer server. For example, one or more encrypted portions of the data may be transmitted from the device to the card issuer server for activation of the card.

In block 1208, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1210, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

What is claimed is:

1. A computer-implemented method to perform an activation for a contactless card via a mobile device, comprising:
receiving, by the mobile device, a first uniform resource locator (URL) for an application from the contactless card via a wireless interface, the application configured to perform the activation;
launching, by the mobile device, the application responsive to receiving the first URL;
writing, by the mobile device, a second URL to the contactless card via the wireless interface, the second URL received from the application, and the second URL comprising a link to a location within the application at which conditions associated with the contactless card are stored;

receiving, by the mobile device, information related to the contactless card via the wireless interface, the information comprising the second URL for the conditions from the contactless card;

generating, by the mobile device, a first unique identifier based on the information related to the contactless card;

presenting, by the mobile device, the conditions associated with the contactless card on a display of the mobile device based on the link in the second URL received via the wireless interface;

writing, by the mobile device, a third URL comprising the first unique identifier to the contactless card;

receiving, by the mobile device, acceptance of the conditions associated with the contactless card based on the contactless card being presented within a maximum range at which the contactless card and the mobile device can communicate;

confirming, by the mobile device, that the same contactless card is being presented to affirm the conditions by reading the third URL and verifying the first unique identifier; and determining, by the mobile device, the contactless card is activated responsive, at least in part, to the conditions being affirmed.

2. The computer-implemented method of claim 1, comprising:

sending, by the mobile device, instructions to the contactless card via the wireless interface, the instructions to instruct an applet of the contactless card to generate a cryptogram; and receiving, by the mobile device, the cryptogram at least partially based on the first unique identifier.

3. The computer-implemented method of claim 2, comprising:

sending, by the mobile device, the cryptogram to a server; and receiving, by the mobile device, a response indicating that the contactless card is activated or not activated.

4. The computer-implemented method of claim 1, wherein the wireless interface is enabled to use a near-field communication (NFC) protocol.

5. The computer-implemented method of claim 1, comprising writing, by the mobile device, a fourth URL to the contactless card via the wireless interface, the fourth URL comprising a second unique identifier of the contactless card and a one-time passcode.

6. The computer-implemented method of claim 5, comprising:

receiving, by the mobile device, the fourth URL from the contactless card via the wireless interface;

sending, by the mobile device, at least the one-time passcode to a server; and receiving, by the mobile device, a response responsive to sending the one-time passcode, the response comprising an account balance associated with the contactless card.

7. The computer-implemented method of claim 6, wherein the response is received via a short message service message or an application message in the application.

8. The computer-implemented method of claim 1, wherein the application is launched by an operating system of the mobile responsive to receiving the first URL.

9. The computer-implemented method of claim 1, wherein the second URL to the conditions is a deep link to a location within the application.

10. An apparatus to exchange universal resource locators with a contactless card, comprising:

a processor; and memory comprising instructions that when executed by the processor, cause the processor to:

receive a first uniform resource locator (URL) for an application from the contactless card via a wireless interface, the application configured to perform an operation for the contactless card;

launch the application responsive to reception of the first URL;

write a second URL to the contactless card via the wireless interface, the second URL comprising a link to a location within the application at which conditions associated with the contactless card are stored;

receive, from the contactless card via the wireless interface, message comprising information related to the contactless card and the second URL;

generate a first unique identifier based on the information of the contactless card;

present the conditions on a display;

write a third URL comprising the first unique identifier to the contactless card;

receive the third URL from the contactless card presented to affirm the conditions;

confirm that the same contactless card is being presented by verifying the first unique identifier based on the third URL; and determine that the contactless card is activated responsive, at least in part, to the conditions being affirmed by the same contactless card.

11. The apparatus of claim 10, the processor to:

send applet instructions to the contactless card via the wireless interface, the applet instructions to instruct an applet of the contactless card to generate a cryptogram; and receive the cryptogram at least partially based on the first unique identifier.

12. The apparatus of claim 11, the processor to:

send the cryptogram to a server; and receive a response indicating that the contactless card is activated or not activated based at least in part the cryptogram.

13. The apparatus of claim 10, wherein the wireless interface issues at least one of a near-field communication (NFC) protocols.

14. The apparatus of claim 10, the processor to write a fourth URL to the contactless card via the wireless interface, the fourth URL comprising a second unique identifier of the contactless card and a one-time passcode.

15. The apparatus of claim 14, the processor to:

receive the fourth URL from the contactless card via the wireless interface;

send at least the one-time passcode to a server; and receive a response responsive to sending the one-time passcode, the response comprising data associated with the contactless card.

16. The apparatus of claim 15, wherein the response is received via a short message service message or an application message in the application.

17. The apparatus of claim 10, wherein the application is launched by an operating system of the apparatus responsive to receiving the first URL.

18. The apparatus of claim 10, wherein the second URL to the conditions is a deep link to a location within the application.

19. A non-transitory computer-readable medium comprising a set of instructions that, in response to being executed by a processor circuit of a contactless card, cause the processor circuit to:
- send, responsive to a first wireless read, a first uniform resource locator (URL) for an application to a mobile device via a wireless interface, the first URL stored in a memory of a contactless card;
- store, in the memory, a second URL for conditions related to the contactless card, the second URL received from the mobile device;
- send, responsive to a second wireless read, the second URL for the conditions to the mobile device and information associated with the contactless card;
- store, in the memory, a third URL for a unique identifier generated by the mobile device to identify the information associated with the contactless card; and
- send, responsive to a third wireless read, the third URL to affirm the conditions, wherein the unique identifier at the third URL confirms that the same contactless card is being presented to affirm the conditions.

20. The non-transitory computer-readable medium of claim 19, wherein the set of instructions in response to being executed by the processor circuit cause the processor circuit to:
- execute an applet based on instructions received from the mobile device, the applet to generate a cryptogram; and
- send, responsive to a fourth query, the cryptogram to the mobile device, the cryptogram comprising an encrypted unique identifier generated from the unique identifier.

* * * * *